United States Patent
Gorman et al.

(10) Patent No.: US 8,371,414 B2
(45) Date of Patent: Feb. 12, 2013

(54) SYSTEM FOR ELECTRONICALLY CONTROLLING SEAT BELT LOAD LEVELS DURING AN EVENT

(75) Inventors: David J. Gorman, Royal Oak, MI (US); Florian F. Dutke, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 135 days.

(21) Appl. No.: 12/985,402

(22) Filed: Jan. 6, 2011

(65) Prior Publication Data

US 2012/0175453 A1 Jul. 12, 2012

(51) Int. Cl.
*B60R 22/00* (2006.01)
*B60R 22/28* (2006.01)

(52) U.S. Cl. ............... 180/268; 280/805; 297/479

(58) Field of Classification Search .......... 280/805, 280/801.1; 180/268; 297/476, 477, 479, 297/470
See application file for complete search history.

(56) References Cited

U.S. PATENT DOCUMENTS

| | | | | |
|---|---|---|---|---|
| 3,287,062 A * | 11/1966 | Board et al. | | 297/479 |
| 3,695,697 A * | 10/1972 | Stoffel | | 297/479 |
| 3,847,434 A * | 11/1974 | Weman | | 297/478 |
| 4,120,466 A * | 10/1978 | Adomeit | | 242/381.4 |
| 4,323,204 A * | 4/1982 | Takada | | 242/381.4 |
| 4,485,985 A * | 12/1984 | Fohl | | 242/381.4 |
| 4,550,951 A * | 11/1985 | Apri | | 297/480 |
| 5,029,896 A * | 7/1991 | Ernst | | 280/806 |
| 5,242,213 A * | 9/1993 | Fohl | | 297/472 |
| 5,411,292 A * | 5/1995 | Collins et al. | | 280/806 |
| 5,423,598 A * | 6/1995 | Lane et al. | | 297/479 |
| 5,531,479 A * | 7/1996 | Bauer | | 280/806 |
| 6,213,510 B1 * | 4/2001 | Suyama | | 280/805 |
| 6,793,249 B2 * | 9/2004 | Lobert et al. | | 280/806 |
| 6,824,222 B2 * | 11/2004 | Maloney et al. | | 297/478 |
| 6,877,776 B2 * | 4/2005 | Ukita et al. | | 280/806 |
| 7,413,220 B2 * | 8/2008 | Itoga et al. | | 280/742 |
| 8,165,760 B2 * | 4/2012 | Cuddihy et al. | | 701/45 |
| 2007/0096447 A1 * | 5/2007 | Tabe | | 280/735 |
| 2009/0267339 A1 * | 10/2009 | Usoro et al. | | 280/807 |

* cited by examiner

*Primary Examiner* — Drew Brown
(74) *Attorney, Agent, or Firm* — Quinn Law Group, PLLC

(57) ABSTRACT

A system for electronically controlling seat belt load levels during an event includes a first and second compression member, and a seat belt webbing disposed between the first and second compression members. The first and second compression members may cooperate in a manner such that they may apply a selectively variable compression force to the seat belt webbing.

20 Claims, 3 Drawing Sheets

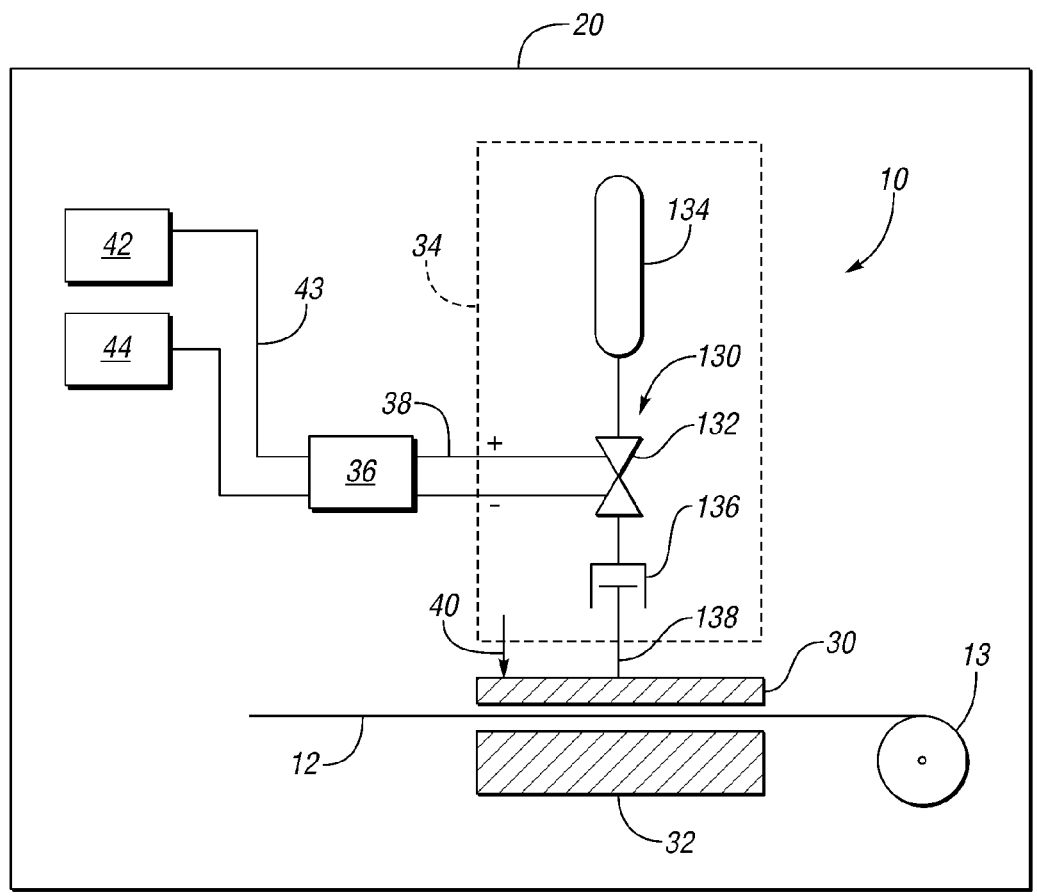
FIG. 2
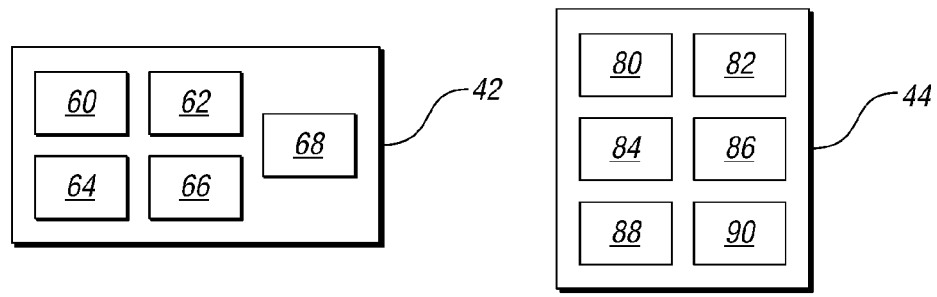
FIG. 3
FIG. 4

SYSTEM FOR ELECTRONICALLY CONTROLLING SEAT BELT LOAD LEVELS DURING AN EVENT

TECHNICAL FIELD

The present invention relates generally to seat belt load leveling.

BACKGROUND

A seat belt is a harness that is part of an overall vehicle passive restraint system. Seat belts are designed to secure an occupant of a vehicle against movement that may result if the vehicle is involved in sudden acceleration or deceleration. A seat belt system is generally connected to the vehicle at three points, and may include a lap belt portion and a shoulder belt portion. A webbing of the shoulder belt portion may generally extend from a retractor situated at a lower portion of a pillar of the vehicle, and slides through a guide loop, which may also be known as a D-ring or turning loop.

SUMMARY

A system for electronically controlling seat belt load levels during an event includes a first and second compression member, and a seat belt webbing disposed between the first and second compression members. The first and second compression members may cooperate in a manner such that they may apply a selectively variable compression force to the seat belt webbing that may restrain the seat belt webbing from relatively slipping between the first and second compression members.

The system may include a controller configured to monitor a parameter indicative of a vehicle event and to generate a variable actuation signal in response thereto. The system may further include an actuator configured to receive the variable actuation signal from the controller, and, in response, to selectively urge the first compression member against the second compression member. In an embodiment, the parameter indicative of a vehicle event may be provided by an event sensor, and may be representative of a vehicle acceleration rate, seat belt spooling rate, seat belt tension, vehicle roll rate, or airbag deployment occurrence.

The controller may additionally be configured to monitor an attribute of an occupant and adjust the variable actuation signal in response thereto. The occupant's attribute(s) may be monitored by an occupant sensor, and may be representative of, for example, a weight, rear view mirror position, total initial seat belt payout, floor pedal position, steering wheel position, or seat position.

The actuator configured to urge the first compression member against the second compression member may include a piston cylinder having a movable ram that is in mechanical communication with the first compression member, a pressurized fluid source in fluid communication with the piston cylinder, and an electronically controlled valve configured to modulate the flow of a fluid between the pressurized fluid source and the piston cylinder in response to the variable actuation signal. In an embodiment, the electronically controlled valve may be a piezoelectric valve, which may be responsive to a variable voltage actuation signal. The pressurized fluid source may include a vessel containing, for example, a compressed inert gas.

In another embodiment, the actuator may include a hydraulic cylinder containing a hydraulic fluid, a piezoelectric device in mechanical communication with the hydraulic cylinder, and a fluid line in fluid communication with the hydraulic cylinder. Actuation of the piezoelectric device may be configured to apply a force to a fluid contained within the hydraulic cylinder, which may cause the first compression member to controllably move towards the second compression member.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic diagram of a system for electronically controlling seat belt loading during an event.

FIG. 3 is a schematic diagram of an event sensor of the kind illustrated in FIG. 2.

FIG. 4 is a schematic diagram of an occupant sensor of the kind illustrated in FIG. 2.

DETAILED DESCRIPTION

Figure 1:
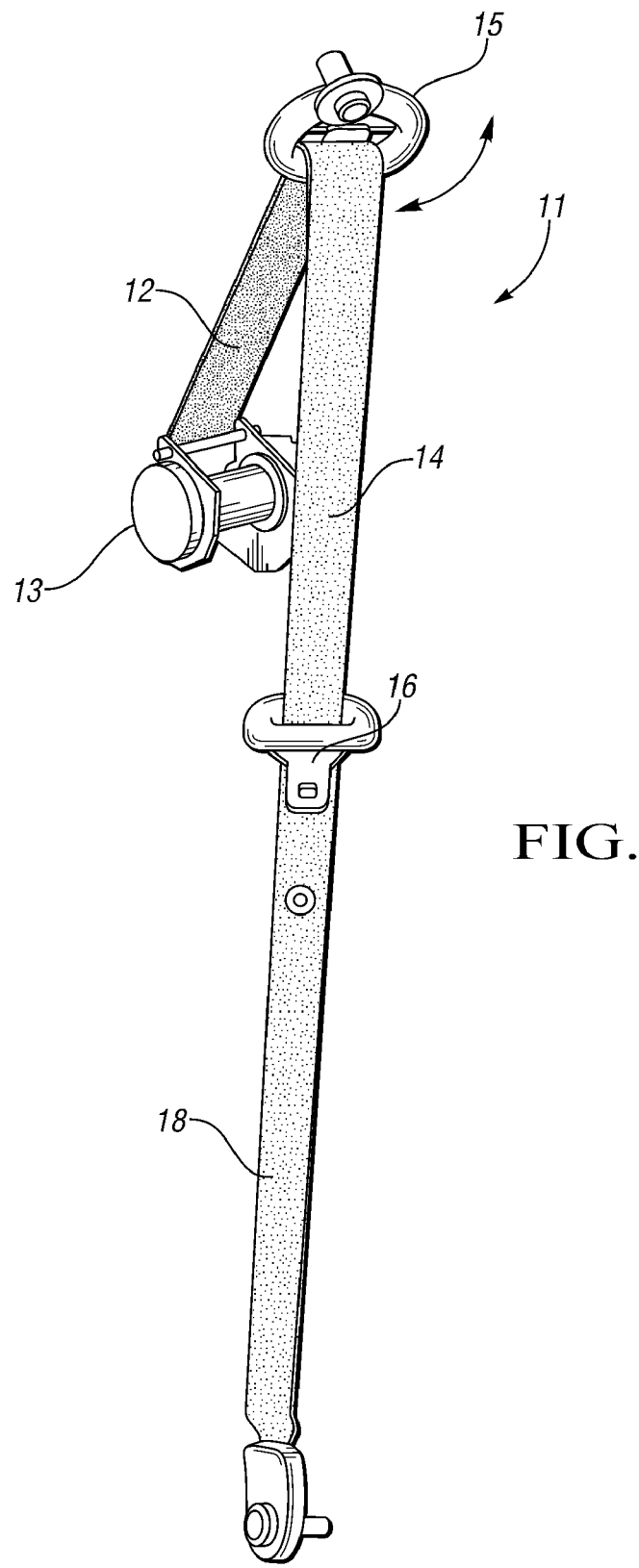
FIG. 1 is a schematic perspective view of a vehicle seat belt system.

Referring to the drawings, wherein like reference numerals are used to identify like or identical components in the various views, a system 10 for electronically controlling seat belt load levels during an event is generally illustrated in FIG. 2. The system 10 is typically useful for automotive vehicle applications; however, it is to be appreciated that the system 10 may also be useful for other vehicular applications, such as, but not limited to, aviation and rail vehicles.

By way of general background explanation, and with reference to a conventional vehicle seat belt system 11 shown generally in FIG. 1, a seat belt webbing 12 may extend from a retractor 13 that may be positioned near a lower portion of a vehicle support pillar (not shown). For example, in an automobile, the retractor 13 may be disposed near a lower portion of a B-, C-, or D-pillar of the vehicle. Alternatively, the retractor may be located within a portion of the seat, roof member or body member. The seat belt webbing 12 may then slide through a conventional guide loop 15 and may be directed down and across an occupant's upper body (not shown) to form a shoulder belt portion 14 of the conventional seat belt system 11. To secure the seat belt webbing 12 for restraining the occupant of the vehicle, the occupant may insert a tongue latch 16 into a seat belt buckle (not shown), and thereby form a lap belt portion 18 of the conventional vehicle seat belt system 11.

As illustrated in FIG. 2, a system 10 may be used within a vehicle 20 to vary a restraining force applied through the seat belt webbing 12 by continuously varying a clamping force on a portion of the seat belt webbing 12. The system 10 may include a first compression member 30 and a second compression member 32 that are positioned on either side of the seat belt webbing 12. When actuated, the first and second compression members 30, 32 may cooperate to apply a selectively variable compressive force on a portion of the seat belt webbing. In an embodiment, the compression members 30, 32 may be located near the refractor 13, such as for example, within a portion of a B-, C-, or D-pillar of the vehicle. Alternatively, one of the compression members may be integrated into a portion of the guide loop 15 (illustrated in FIG. 1).

The system may include an actuator 34 configured to generate the compressive force between the two compression members 30, 32, and a controller 36 that may direct the operation of the actuator 34 through a provided actuation signal 38. The actuator 34 may be configured to receive the actuation signal 38 from the controller 36, and to translate the signal into a variable force 40 applied to one or both of the members 30, 32. This variable force 40 may, for example, urge the first member 30 against the second member 32, thus applying a compressive force to the seat belt webbing 12. The compressive force may result in a corresponding frictional resistance that may inhibit the webbing 12 from relatively slipping between the two members 30, 32. Each of the first and second compression members 30, 32 may include a friction plate that is configured to provide a gripping pressure against an area of the webbing 12, and may be provided with a surface texture that enhances its ability to frictionally engage the webbing 12.

The controller 36 that directs the operation of the actuator may generate the variable actuation signal 38 using vehicle information received from one or more event sensors 42. Each event sensor 42 may be configured to sense a particular behavior of the vehicle, and may provide a corresponding signal 43 to the controller 36. Exemplary vehicle events may include, for example, a sudden acceleration or deceleration of the vehicle. As further illustrated in FIG. 3, parameters that an event sensor 42 may be configured to monitor may include, for example, the magnitude and/or direction of a vehicle acceleration 60, a vehicle roll angle 62, a seat belt spooling rate 64, a seat belt tension 66, and/or the occurrence of an airbag deployment 68.

If the controller 36 detects a sharp change in a monitored vehicle parameter, it may be configured to respond in a commensurate manner to restrain undesired extension of the seat belt webbing 12 from the retractor 13. For example, if the controller detects a rapid vehicle deceleration, or receives an indication that an airbag deployment has been initiated, it may direct the actuator 34 to controllably restrain payout of the seat belt webbing 12 via compression members 30, 32. Using the measured magnitude, severity, and/or directionality of the event, the controller 36 may further be configured to selectively vary the amount of restraining force that is applied through the webbing 12. In an embodiment, the controller 36 may be configured to use indications of the event severity and directionality to minimize the restraining force applied through the webbing 12, while also maintaining the total seat belt extension from the retractor 13 within an acceptable range.

To further refine the amount of restraining force needed for an event of a particular severity, the controller 36 may account for one or more physical attributes of an occupant. Occupant attributes may be sensed by one or more occupant sensors 44, and may relate to the stature or spatial positioning of the occupant within the vehicle 20. For example, as may be appreciated, the restraining force needed to restrain a 95% male during an impact may be significantly more than the restraining force necessary for a small child. Likewise, an occupant sitting exceptionally close to the steering wheel may have a smaller available belt extension than a person sitting farther back from the steering wheel. Therefore, as illustrated in FIG. 4, an occupant sensor 44 may monitor one or more attributes of an occupant, including, for example, a weight 80, rear view mirror position 82, total seat belt payout/extension 84, floor pedal position 86, steering column position 88, and/or seat position 90. In another embodiment, certain occupant attributes may be manually entered by the occupant, such as, without limitation, height, weight, and/or gender.

Figure 5:
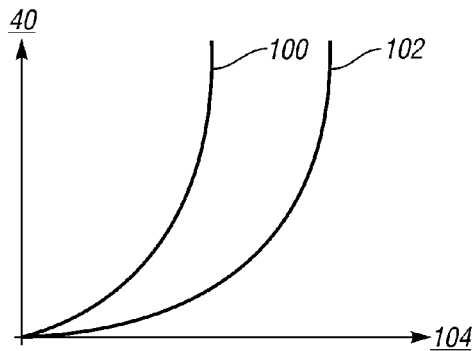
FIG. 5 is a representative graph illustrating adjustable seat belt loading profiles.

FIG. 5 illustrates two exemplary load profiles 100, 102 that the system 10 may apply through the webbing 12. Each load profile 100, 102 may represent the application of a variable compression force 40 that may be applied to one or both of the members 30, 32 over time 104. The controller 36 may apply the chosen load profile to the compression members and correspondingly to the seat belt webbing 12 by providing a corresponding actuation signal 38 to the actuator 34. As discussed above, the controller 36 may choose or optimize a load profile that is appropriate for a particular event based on sensed qualities of the event and/or occupant. In an embodiment, the controller 36 may be configured to modify the applied restraining force during the course of an event using real time information from the one or more event sensors 42 and/or occupant sensors 44. In another embodiment, the load profile may be predetermined based on the occupant attributes and impact severity. Such a load profile may, for example, be stored in a lookup table and may be quickly accessed by the controller 36 during the event.

Figure 6:
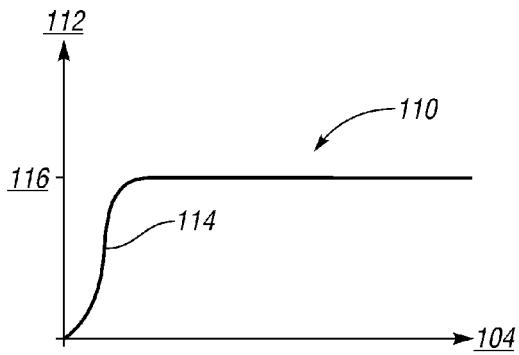
FIG. 6 is a representative graph of a force load applied through a webbing of a seat belt system.

FIG. 6 represents a profile 110 of the force 112 applied on/through seat belt webbing 12 over time 104. As shown, following the initial loading portion 114, which may be similar to one of the loading profiles represented in FIG. 5, the system 10 may be configured to maintain a constant force on the seat belt webbing 12 at a determined level 116. The system may choose the level 116 based on the severity of the event, inferred physical size/weight of occupant, occupant-to-vehicle environmental constraints, and/or applicable governmental regulations.

Figure 7:
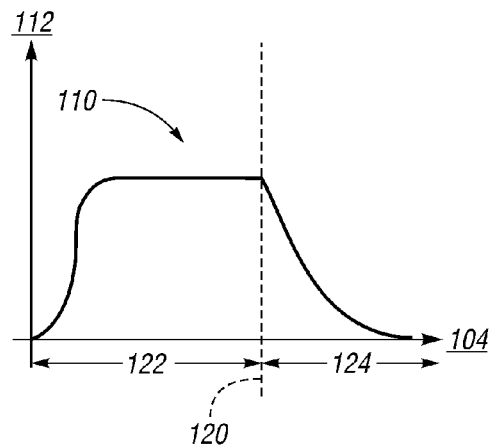
FIG. 7 is a representative graph of a force load applied through a webbing of a seat belt system, where the load is adapted for engagement with an airbag restraint.

While FIG. 6 illustrates a seat belt load profile 110 that maintains a constant force at a predetermined level 116, the controller 36 may also be able to account for other restraint systems within the vehicle. FIG. 7 illustrates the profile 110 shown in FIG. 6, adapted for the deployment of a vehicle airbag at a time 120. During a first period 122, the seat belt may be the sole restraint system, and may maintain a force through the webbing 12 at a constant level. Following the deployment of an airbag at time 120, the force 40 applied through the webbing 12 may be configured to decline according to the influence of the airbag (i.e., in period 124).

Referring again to FIG. 2, in an embodiment, the actuator 34 may be electrically controlled by providing a variable voltage electrical actuation signal 38 to a piezoelectric device 130. The piezoelectric device 130 may, for example, include a piezoelectric valve 132 that may modulate the flow of a fluid between a pressurized fluid source 134 and a piston cylinder 136. The pressurized fluid source 134 may be a vessel that contains a compressed inert gas, such as compressed argon, or may include a hybrid or pyrotechnic gas generator. The piston cylinder 136 may include a movable ram 138 that is in mechanical communication with a compression member (e.g., compression member 30) and may move the member through a forced change in volume of the cylinder. Upon receipt of the variable voltage actuation signal 38, the piezoelectric valve 132 may allow fluid to pass into the piston cylinder 136 and cause the cylinder to expand, thus moving the compression member 30. The piston cylinder 136 of the actuator 34 may likewise have a controllable vent and biasing spring that may allow the compression member to return to an initial state apart from the webbing 12 when desired. In an embodiment, the controllable vent may be electronically controlled, such as through a piezoelectric valve, and may be used to modulate the relief of pressure from the webbing 12. The controllable vent may either be separate from, or integral with the piezoelectric valve 132. While a piezoelectric-type valve may be a preferred type of valve due to the fast response time and controllable nature of piezoelectrics, other electronically controlled valves may be similarly used. Exemplary electronic valves may include the use of solenoids, voice coils, shape memory alloys, or other actuators known in the art.

Figure 8:
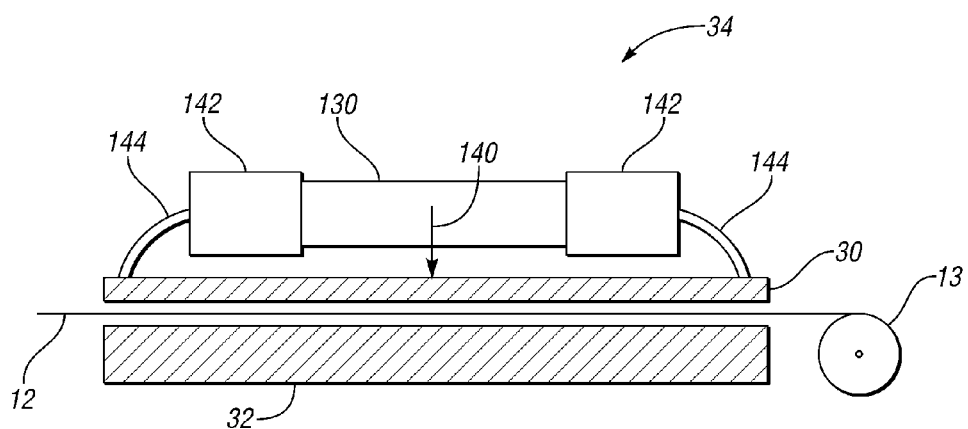
FIG. 8 is a schematic diagram of an embodiment of an actuator for electronically controlling seat belt loading during an event.

FIG. 8 illustrates another exemplary actuator 34 that may be used to apply a variable force 140 between two compression members 30, 32. The actuator may include a piezoelectric device 130 in mechanical communication with one or more hydraulic cylinders 142, where actuation of the piezoelectric device may be configured to apply a force to a fluid contained within the hydraulic cylinder. Each hydraulic cylinder may be coupled with a respective fluid line 144 that has a significantly smaller diameter than the cylinder. While the piezoelectric device 130 may only be capable of providing a small actuation movement (though with a significant force), the differences in diameters between the hydraulic cylinder 142 and fluid line 144 may greatly multiply the provided actuation movement. Each fluid line 144 may be coupled with a ram or other corresponding device that may transfer the fluid pressure/movement into an applied pressure of the compression member 30.

While the best modes for carrying out the invention have been described in detail, those familiar with the art to which this invention relates will recognize various alternative designs and embodiments for practicing the invention within the scope of the appended claims. All directional references (e.g., upper, lower, upward, downward, left, right, leftward, rightward, above, below, vertical, and horizontal) are only used for identification purposes to aid the reader's understanding of the present invention, and do not create limitations, particularly as to the position, orientation, or use of the invention. It is intended that all matter contained in the above description or shown in the accompanying drawings shall be interpreted as illustrative only and not as limiting.

The invention claimed is:

1. A system for electronically controlling seat belt load levels during an event, the system comprising:
   a first compression member;
   a second compression member;
   a seat belt webbing disposed between the first and second compression member; and
   wherein the first compression member and the second compression member cooperate to apply a selectively variable compression force to the seat belt webbing.

2. The system of claim 1, wherein the selectively variable compression force restrains the seat belt webbing from relative slippage between the first and second compression members.

3. The system of claim 1 further comprising:
   a controller configured to monitor a parameter indicative of a vehicle event and to generate a variable actuation signal in response thereto; and
   an actuator configured to receive the variable actuation signal from the controller, and, in response, to selectively urge the first compression member against the second compression member.

4. The system of claim 3, wherein the parameter indicative of a vehicle event is provided by an event sensor.

5. The system of claim 3, wherein the parameter indicative of a vehicle event includes a vehicle acceleration, seat belt spooling rate, seat belt tension, vehicle roll rate or airbag deployment occurrence.

6. The system of claim 3, wherein the controller is further configured to monitor an attribute of an occupant and adjust the variable actuation signal in response thereto.

7. The system of claim 6, wherein the attribute of an occupant is sensed by an occupant sensor.

8. The system of claim 6, wherein the attribute of an occupant includes a weight, rear view mirror position, initial seat belt payout, floor pedal position, steering wheel position, or seat position.

9. The system of claim 3, wherein the actuator comprises:
   a piston cylinder having a movable ram in mechanical communication with the first compression member;
   a pressurized fluid source in fluid communication with the piston cylinder; and
   an electronically controlled valve configured to modulate the flow of a fluid between the pressurized fluid source and the piston cylinder in response to the variable actuation signal.

10. The system of claim 9, wherein the electronically controlled valve is a piezoelectric valve.

11. The system of claim 10, wherein the variable actuation signal is a variable voltage signal.

12. The system of claim 9, wherein the pressurized fluid source includes a vessel containing a compressed gas or a pyrotechnic gas generator.

13. The system of claim 3, wherein the actuator comprises:
   a hydraulic cylinder;
   a hydraulic fluid disposed within the hydraulic cylinder;
   a piezoelectric device in mechanical communication with the hydraulic cylinder;
   a fluid line in fluid communication with the hydraulic cylinder; and
   wherein actuation of the piezoelectric device is configured to apply a force to a fluid contained within the hydraulic cylinder.

14. A system for electronically controlling seat belt load levels during an event, the system comprising:
   a first compression member;
   a second compression member;
   a seat belt webbing disposed between the first and second compression member; and
   a controller configured to monitor a parameter indicative of a vehicle event and to generate a variable actuation signal in response thereto;
   an actuator configured to receive the variable actuation signal from the controller, and, in response, to selectively urge the first compression member against the second compression member; and
   wherein the first compression member and the second compression member cooperate to apply a selectively variable compression force to the seat belt webbing.

15. The system of claim 14, wherein the parameter indicative of a vehicle event is provided by an event sensor, and is representative of a vehicle acceleration, vehicle roll rate, seat belt spooling rate, seat belt tension, or airbag deployment occurrence.

16. The system of claim 14, wherein the controller is further configured to monitor an attribute of an occupant and adjust the variable actuation signal in response thereto.

17. The system of claim 16, wherein the attribute of an occupant includes a weight, height, gender, rear view mirror position, initial seat belt payout, floor pedal position, steering wheel position, or seat position.

18. The system of claim 14, wherein the actuator comprises:
   a piston cylinder having a movable ram in mechanical communication with the first compression member;
   a pressurized fluid source in fluid communication with the piston cylinder; and
   an electronically controlled valve configured to modulate the flow of a fluid between the pressurized fluid source and the piston cylinder in response to the variable actuation signal.

19. The system of claim 18, wherein the electronically controlled valve is a piezoelectric valve.

20. A system for electronically controlling seat belt load levels during an event, the system comprising:
   a first compression member;
   a second compression member;
   a seat belt webbing disposed between the first and second compression member; and
   a controller configured to monitor a parameter indicative of a vehicle event and an attribute of an occupant, and configured to generate a variable actuation signal in response thereto; and
   an actuator configured to receive the variable actuation signal from the controller, and, in response, to selectively urge the first compression member against the second compression member and thereby apply a pressure to the seat belt webbing, the actuator including a piezoelectric device;
   wherein the actuator is further configured to controllably relieve the pressure from the webbing; and
   wherein the first compression member and the second compression member cooperate to apply a selectively variable compression force to the seat belt webbing.

* * * * *